April 10, 1973 TAKUITSU NISHIKAWA ET AL 3,726,701
METHOD FOR CONTROLLING DEPOSIT OF COATING
MATERIAL IN ELECTROSTATIC COATING
Filed Aug. 13, 1971 6 Sheets-Sheet 1

INVENTORS
KANGO SAKAI
TAKUITSU NISHIKAWA
AKIRA NINOMIYA

United States Patent Office 3,726,701
Patented Apr. 10, 1973

3,726,701
METHOD FOR CONTROLLING DEPOSIT OF COATING MATERIAL IN ELECTROSTATIC COATING
Takuitsu Nishikawa, Yokohama, Akira Ninomiya, Kawasaki, and Kango Sakai, Kitakyushu, Japan, assignors to Nippon Kogei Kogyo Kabushiki Kaisha, Tokyo, Japan
Filed Aug. 13, 1971, Ser. No. 171,440
Claims priority, application Japan, May 11, 1971,
46/30,830
Int. Cl. B05b 5/02
U.S. Cl. 117—17     8 Claims

ABSTRACT OF THE DISCLOSURE

A method for controlling the deposition of an electrostatic coating material is disclosed. According to the method, a mist of coating material is first formed in a mist generator. The mist is then carried by an air stream to a delivery equalizer through which the mist is uniformly supplied to a mist container. The air stream subsequently carries the mist from the mist container to an electrostatic charging zone wherein the mist receives an electrostatic charge. Finally, the charged mist is supplied to an electrostatic deposition zone and is deposited on a continuously running sheet.

The quantity of coating mist is controlled by adjusting both the air-flow for carrying the mist and controlling the potential in the electrostatic charging zone in response to the variations in the speed of the continuous sheet.

BACKGROUND OF THE INVENTION

Field of the invention

This invention relates generally to a method for controlling the deposition of coating material on a continuously running sheet, and more particularly to a method for controlling the deposition of coating material on a continuously running sheet in response to the running speed of the sheet.

Description of the prior art

Many situations exist in which it is desirable to apply a uniform electrostatic coating to a continuous sheet or web and to maintain the coating uniform regardless of the speed of the web. For example, it is desirable to apply an ultrathin film of oil to steel strips in tin plating and chromium plating operations to prevent rust. Similarly, it is desirable to apply an ultrathin film of oil to aluminum strips to improve their resistance to corrosion and to improve their ability to undergo printing operations.

A conventional system for controlling the deposition of a coating material is shown diagrammatically in FIG. 2. This system, which was disclosed in U.S. Pat. No. 2,994,618, includes a tachometer generator 2 which detects the running speed of a continuous sheet. The tachometer output is converted by a converter 3 and is applied to a ratio setter 4, 5. The output of the ratio setter 4, 5 is passed through a controller 8 and a converter 11 to a flow adjusting valve 14. An air source 13 is coupled to the converter 11 for regulating the volume of air flow through the valve 14. A blower 15 generates a mist carrying air supply, and the volume of its output is measured at a detector orifice 16. The signal from the detector orifice 16 is passed through a converter 17 and a linearizer 12 to the ratio setter 4, 5 which then automatically adjusts the valve 14. Accordingly, the system automatically controls the air supply for a mist chamber 24. However, in this conventional method, it was difficult to accurately control the deposition of coating material on a web running at varying speeds. Speed variations in the running rates or continuous sheets are common in the production of strip steel, and similar materials, for example.

The difficulty of controlling the deposition of coating material is illustrated by the characteristic curves shown in FIG. 3. FIG. 3 is a graph depicting deposition rate along its vertical axis and charging voltage along its horizontal axis with air flow for carrying the coating material as a parameter. The characteristic curve X, for example, shows the deposition rate of coating material on a continuous sheet for various electric potentials, with a constant air flow rate.

As shown in FIG. 3, the deposition of coating material is quite small in the voltage range designated A, which is the lowest charging voltage range. When the charging voltage is increased to the range designated B, which is in the middle of the charging voltage range, the deposition of coating material is remarkably increased. When the charging voltage is further increased to the range designated C, the deposition of coating material decreases sharply. When the charging voltage is further increased toward the upper limits of the range C, the supply of coating material in the deposition zone decreases until finally, a short circuit is caused between the charging electrode and the deposition electrode, rendering the coating apparatus inoperative. Thus the characteristic curve X in FIG. 3 illustrates that the rate of deposition of the coating material can be maximized by proper selection of the charging voltage.

The rate at which coating material is deposited can also be varied by selecting the volume of air flow for carrying the coating material, which is in mist form. In FIG. 3, the characteristic curves W, Z, X and Y represent the deposition rate versus charging voltage for increasing air flow volumes. As is clear from the graph, the rate of deposition increases the volume of air flow is increased. However, each of the characteristic curves has a maximum at a different charging voltage. For example, for the air flow volume represented by the curve W, a maximum deposition of coating material is provided if the charging voltage is set at the level designated *d*. Similarly, curves X, Y and Z have maxima at charging voltages *a*, *b* and *c*, respectively.

In conventional coating methods, a mist of coating material is first charged with an electric potential in a charging zone. The charged mist of coating material is then deposited on the surface of a continuous sheet by the application of an electrostatic force in the deposition zone. The supply of coating material is controlled by the volume of air flow provided for carrying the coating material to the deposition zone, while the charging voltage in the charging zone is always maintained at a constant value. However, as pointed out above, the deposition rate of the coating materials varies with both the volume of air flow and the charging voltage. Thus, when attempts are made to adjust the deposition rate in accordance with the speed of a moving sheet or web merely by adjusting the volume of air flow, a highly inaccurate control of the deposition rate results.

For example, referring again to FIG. 3, the charging voltage may be set at the level designated *a* in conventional coating methods. The deposition rate obtained by controlling the volume of air flow in such conventional methods is then given by the points at which a line representing the charging voltage of magnitude *a* intersects the various curves W, Z, X and Y. As shown in the FIG. 3, this line intersects the Y curve at a point Y′, the X curve at a point X′, the Z curve at a point Z′ and intersects the W curve at the horizontal axis. Thus it is seen from FIG. 3 that if the charging voltage is maintained at a constant level, variations in the air flow volume are limited. For example, if the air flow volume is reduced to the level represented by curve W, the deposition rate for the fixed charging voltage *a* is 0. Thus, if conventional coating methods are employed, and the sheet to be coated is assumed to be slowed to a minimal running speed, the air flow volume would be reduced to a level which would presumably maintain the deposition rate constant for the reduced web speed. However, as shown by the graph of FIG. 3, the deposition rate would not be constant, but would in fact fluctuate so that the deposition rate would be substantially decreased as the web speed slowed. For this reason, conventional techniques for controlling the deposition rate of coating materials in proportion to the speed of continuously running sheets or webs has been found to be unsatisfactory.

FIGS. 4, 5 and 6 illustrate more clearly the general relationships which have caused conventional coating control systems and methods to operate unsatisfactorily.

FIG. 4 illustrates the relationship between the running speed of a continuous article to be coated (horizontal axis) and the volume of air flow required to carry a particular amount of coating mist to the material (vertical axis).

FIG. 5 illustrates the relationship between the amount of air flow required to carry a supply of coating material to the article when it is stopped (horizontal axis) and the deposition rate (vertical axis).

FIG. 6 illustrates the relationship between the speed of an article to be coated (horizontal axis) and the deposition rate (vertical axis). As illustrated in FIG. 6, it has been found that the deposition rate of coating material is low in the low speed region, approaches a maximum in a medium speed region, and then decreases markedly in the high speed region. Accordingly, it has been extremely difficult to accurately control the amount of material deposited on the article to be coated. Moreover, microscopic uniformity of the thickness of film deposited on the continuously moving article is also extremely difficult to obtain since the particle size of the coating material is itself irregular.

Consequently, it has been found that it is difficult to accurately maintain a uniform coating thickness in both high and low speed ranges when conventional coating material supply controlling methods are used.

SUMMARY OF THE INVENTION

Accordingly, one object of this invention is to provide a method for controlling deposition of coating material accurately regardless of the running speed of a continuous sheet or web to be coated.

Another object of this invention is to provide a method for controlling the deposition of an electrostatic coating on various different types of materials.

Yet another object of this invention is to provide a method for controlling the deposition of an ultrathin film of oil on a continuously produced steel strip.

Briefly, these and other objects of this invention are attained by providing a method for controlling the deposition of an electrostatic coating material in which a mist of coating material is first formed in a suitable mist generator. The mist is then carried by an air stream to a delivery equilizer through which the mist is uniformly applied to a mist container. The air stream subsequently carries the coating mist to an electrostatic charging zone where the mist receives an electrostatic charge. The charged mist is then fed to an electrostatic deposition zone and deposited on a continuously running sheet. Both the air flow volume and the electrostatic charge are varied according to the running speed of the continuously moving sheet.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DETAILED DESCRIPTION OF THE PREFERRED EMBODIMENTS

Figure 1:
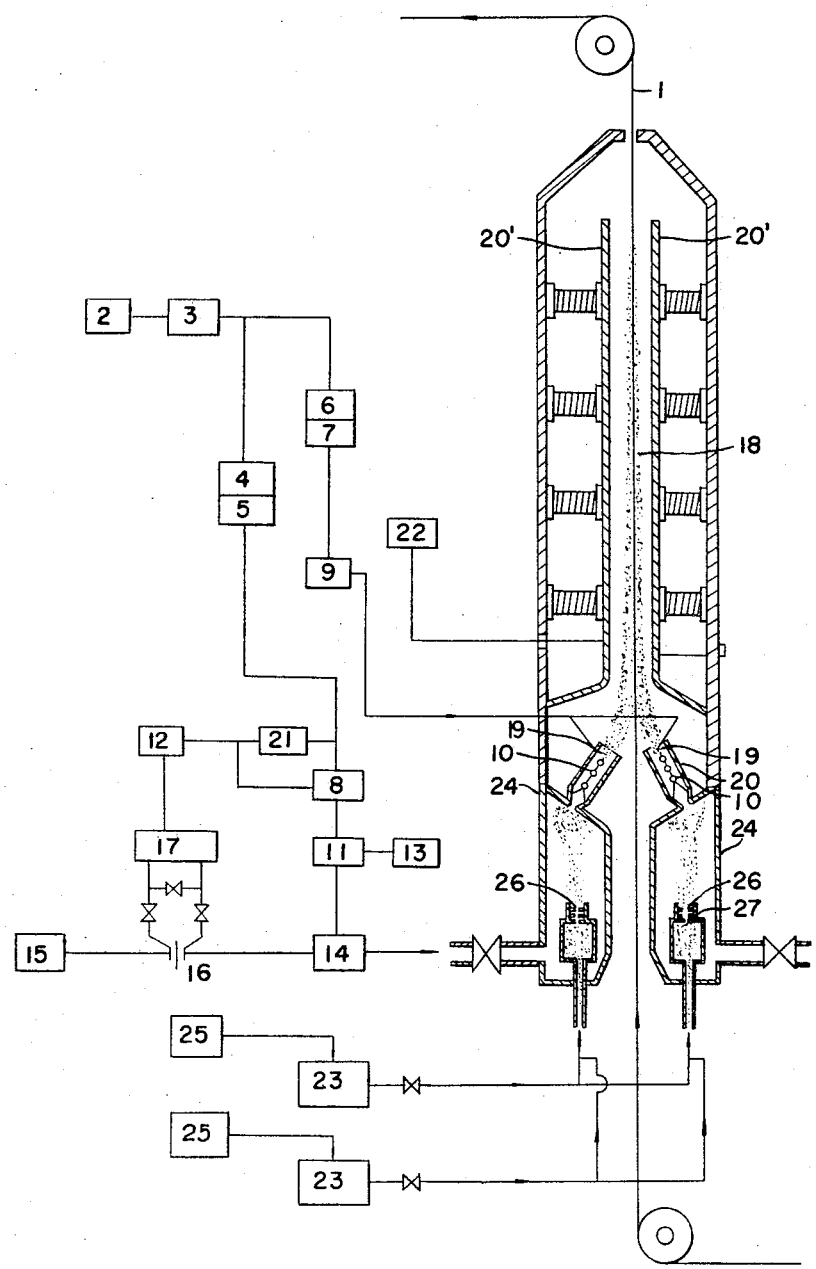
FIG. 1 is a part block diagram and part front sectional view of one embodiment of an apparatus for electrostatic coating according to the present invention.
Figure 2:
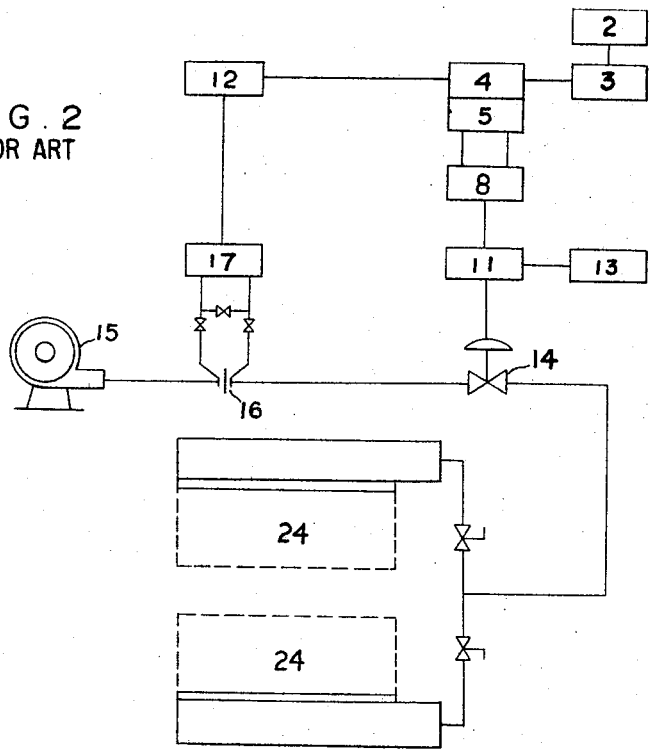
FIG. 2 is a block diagram of a prior art, or conventional apparatus.
Figure 3:
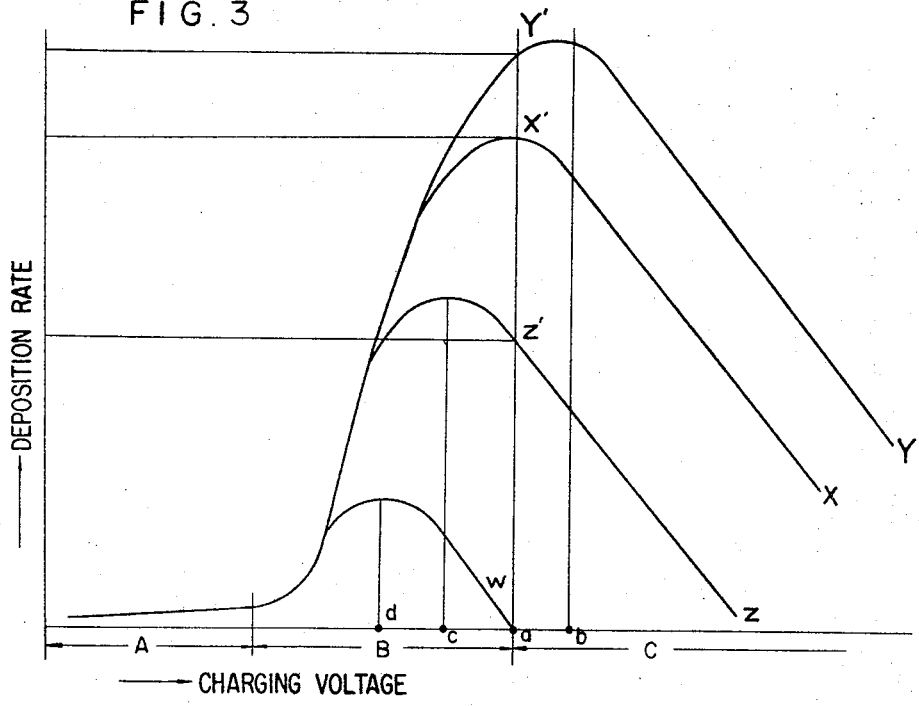
FIG. 3 is a graphical diagram illustrating a plurality of characteristic curves representing the relationship between the charging voltage and the deposition rate for various air flow volumes.
Figure 4:
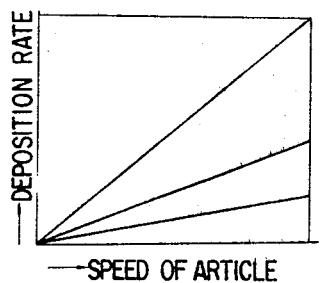
FIG. 4 is a graphical diagram illustrating the relationship between the speed of an article and the air flow for carrying coating material.
Figure 5:
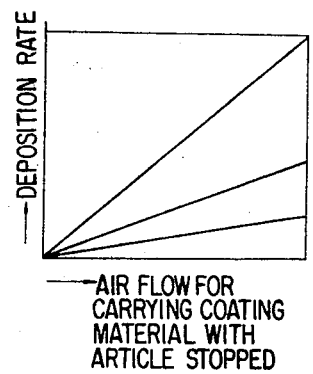
FIG. 5 is a graphical diagram illustrating the relationship between the air flow for carrying coating material to a stationary article and the deposition rate of coating material.
Figure 6:
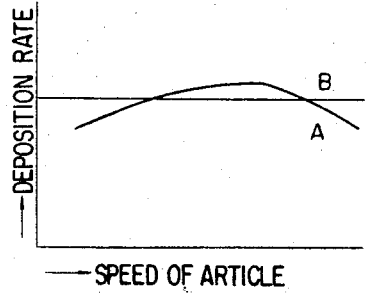
FIG. 6 is a graphical diagram illustrating the relationship between the speed of an article and the rate of deposition of coating material.
Figure 7:
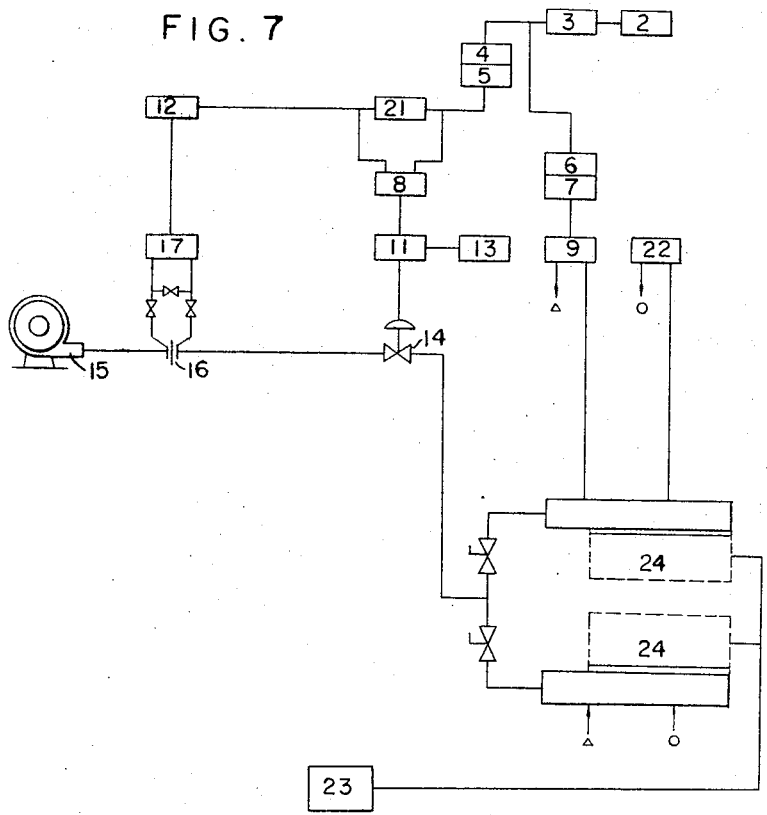
FIG. 7 is a block diagram of a coating apparatus according to another embodiment of this invention.
Figure 8:
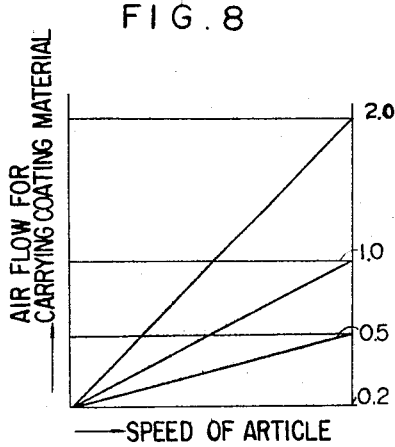
FIG. 8 is a graphical diagram illustrating the relationship between the speed of an article and the air flow for carrying coating material when conventional processes are used.
Figure 9:
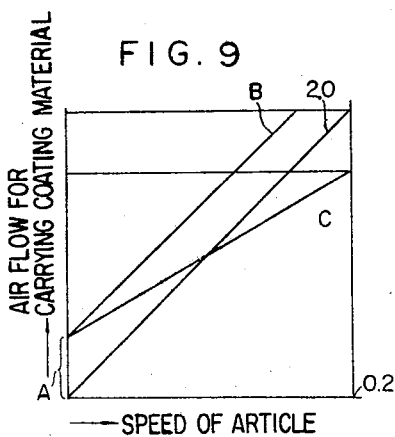
FIG. 9 is a graphical diagram illustrating the relationship between the speed of an article and the air flow for carrying coating material when the method of the present invention is used.
Figure 10:
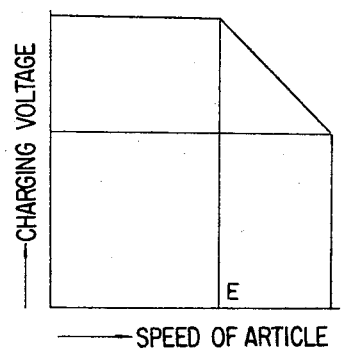
FIG. 10 is a graphical diagram illustrating the relationship between the speed of an article and the charging voltage.
Figure 11:
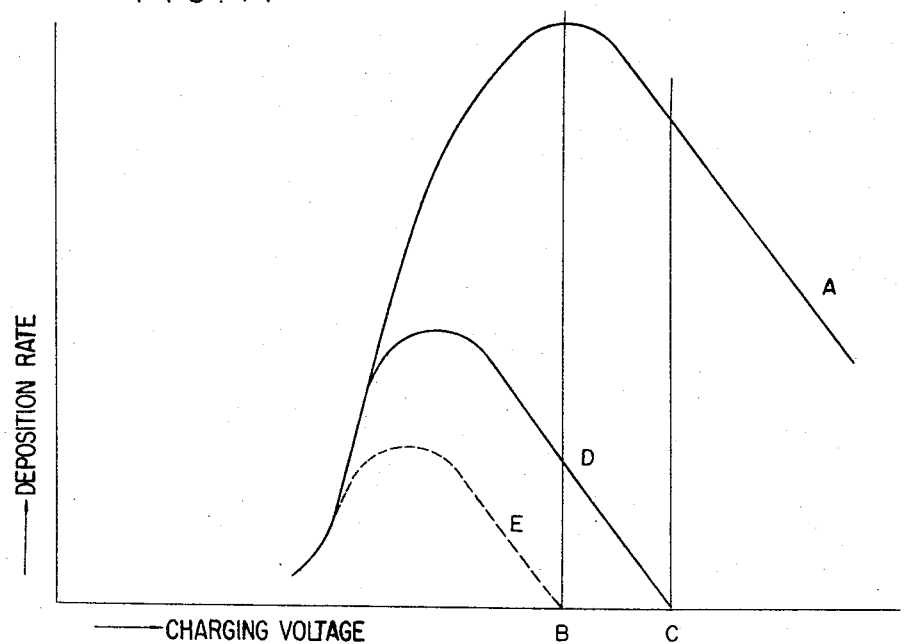
FIG. 11 is a graphical diagram illustrating the relationship between the charging voltage and the deposition rate when the processes of the present invention are used.
Figure 12:
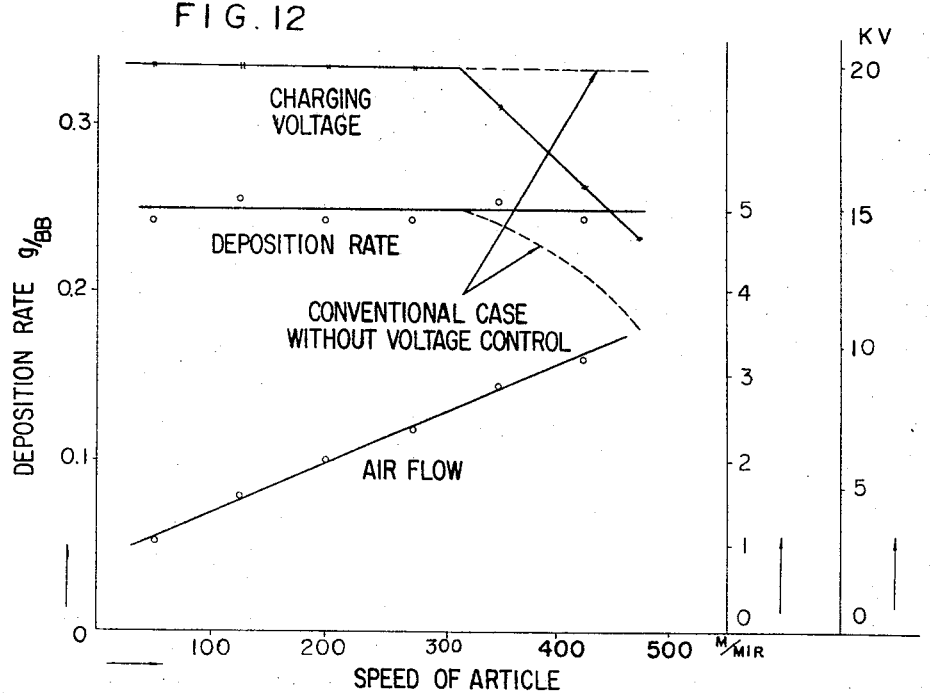
FIG. 12 is a graphical diagram illustrating the relationship between the speed of an article and the deposition rate, illustrating the effect of changing various parameters.
Figure 13:
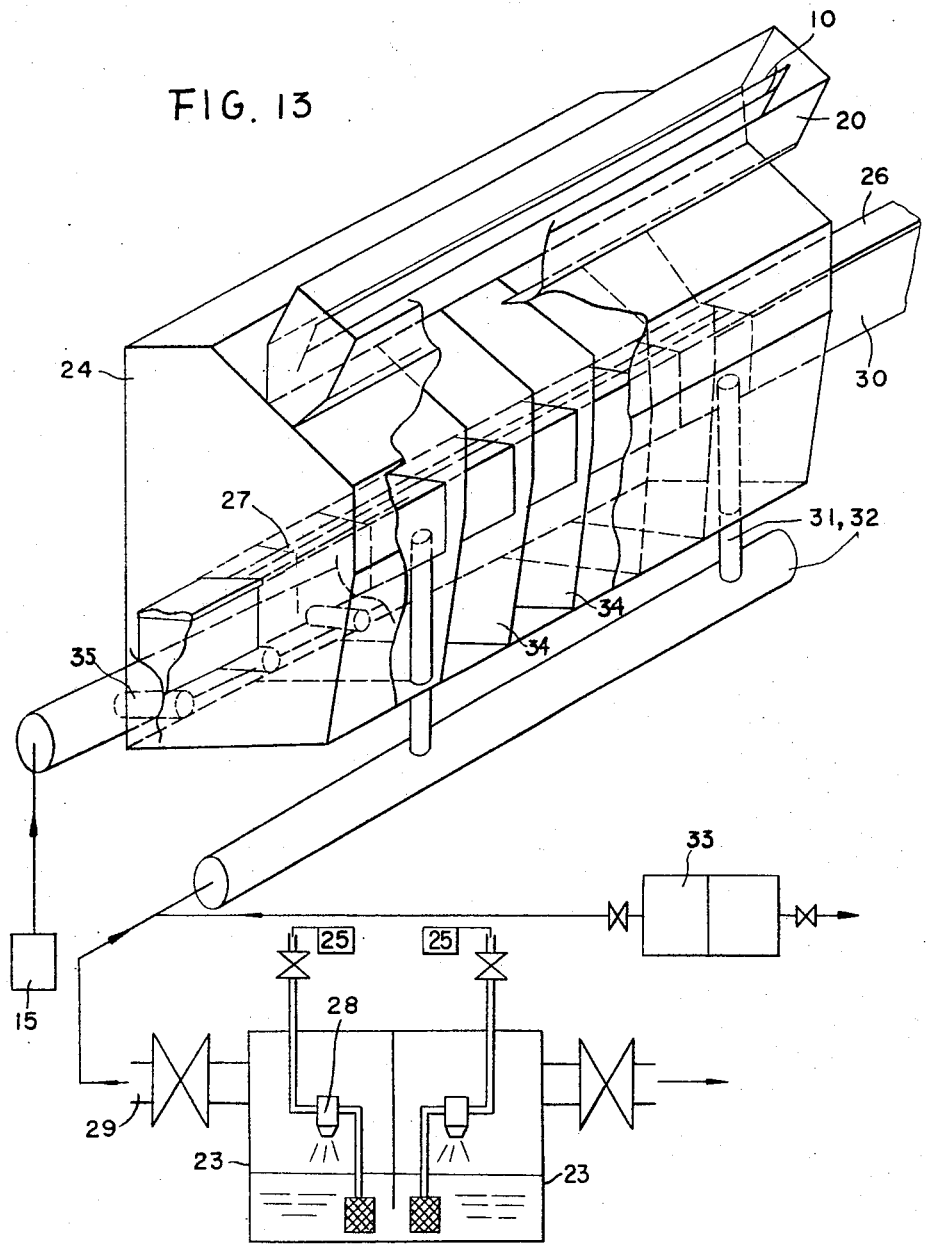
FIG. 13 is a partially schematic and partially perspective view of a mist container, a mist delivering equalizer and a mist generator apparatus according to the embodiment of the present invention illustrated in FIG. 1.

The general method of the present invention is as follows. An electrostatic coating material in mist form is first formed in a mist generator. The mist is then transferred to a mist delivering equalizer through which the mist is uniformly supplied to a mist container. An air flow is supplied to the mist container for transporting the mist to the sheet or web to be coated. The air flow is also used for transporting the mist to an electrostatic charging zone wherein an electrostatic charge is applied to the coating mist. The charged mist is then delivered to an electrostatic deposition zone for deposition on a continuously running sheet which passes through the deposition zone.

When the continuous sheet or web is stopped, a substantial amount of the mist in the mist container condenses and is removed in liquid form through a drain. When the continuous sheet is moving at a slow speed, a part of the mist is deposited on an electrode in the electrostatic charging zone, so that the amount of the charged mist supplied to the deposition zone is controlled. The mist which condenses in the electrostatic charging zone is also removed through a drain. When the running speed of the continuous sheet is increased, the volume of air flow for carrying the mist is also increased, so that the mist loss in the mist container is diminished. The speed of the air flow passing through the electrostatic charging zone is also increased so that the amount of mist lost there is also diminished.

No air flow is provided for carrying the mist when the sheet or web to be coated is stopped. When the sheet or web starts in motion, an air flow having a specific volume is initially provided and the volume of the air flow is increased in accordance with the running speed of the sheet.

Similarly, no electrostatic charge is provided in the deposition zone when the sheet is stopped However, when the sheet is started a predetermined level of electrostatic charge is provided. The electrostatic charge in the electrostatic charging zone is usually constant. However, when the running speed of the sheet is increased above a predetermined speed, the electrostatic charge is decreased depending upon the running speed of the sheet. As a result, the amount of mist coating material is controlled by using the mist container, which includes the mist delivery equalizer, and supplying a volume of air flow for carrying the mist in the mist container. Any excess or condensed mist in the mist container is removed through a drain. In addition, any excess or condensed mist in the electrostatic charging zone is removed through a drain, prior to supplying the mist to the deposition zone.

In order to accurately control the amount of coating mist supplied to the sheet to be coated, a first bias signal is provided for controlling the initial air flow supply to the coating mist. A second bias signal is also provided for controlling the air flow in relationship to the running speed of the sheet. The initial air flow provided by the first bias signal is on the order of 10–30% of the total air flow for carrying the mist in normal operation. The air used for forming the mist in the mist generator forms about 20% of the total air flow required for carrying the mist in normal operation.

In operation, when the running speed of the continuous sheet is more than approximately 250 m./min., it is preferable to decrease the charging voltage corresponding to the running speed. The degree of decrease in the charging voltage is from 0–60%, depending upon the running speed. However, the charging voltage is held at a constant level, such as 20 kv., for example, when the running speed of the sheet is in the range of from 250–300 m./min.

When the running speed of the sheet is above the range of from 250–300 m./min., the charging voltage is decreased for decreasing the deposition of mist in the charging zone.

Referring now to the drawings wherein like reference numerals designate identical or corresponding parts throughout the several views, and more particularly to FIGS. 1 and 7 thereof, the apparatus for carrying out the present invention is shown. A continuous sheet of steel strip 1, produced by a rolling operation for example, is shown running through an electrostatic coating apparatus in FIG. 1. The running speed of the sheet is measured by a tachometer generator 2 or any other equivalent type of generator, such as a dynamo. The signal corresponding to the running speed of the sheet, which is generated by the tachometer, is passed through a converter 3 to a ratio setter 4, which is combined with a bias setter 5. The ratio of setter 4 controls the ratio of air flow to the running speed of the sheet. The bias setter 5 controls the basic air flow.

The air flow is supplied from a blower 15 (see FIG. 7) and passes through a detector orifice 16. The detector generates a signal representing the volume of air flow produced by the blower 15. The signal from the detector 16 is passed through a converter 17 to a linearizer 12. The output of the linearizer 12 is passed to a controller 8 wherein the signals from the ratio setter 4 and the bias setter 5 are combined with it to constitute a control signal. A meter 21 is coupled between the linearizer 12 and the controller 8 for permitting observation of the running speed and air flow.

The control signal developed in the controller 8 is fed to a converter 11 which is in turn coupled to an air source 13 for controlling the output of the air source.

The control signal from the converter 11, as well as the air supplied from the air source 13 are fed to a valve 14. The output of the valve 14 is an air flow which includes a fixed volume of air plus a variable volume of air corresponding to the running speed of the sheet. This output is supplied to a mist container.

The mist of coating material, which may be oil or another lubricant, is prepared in a mist generator 23 to which compressed air is supplied from an air compressor 25. A plurality of mist generators may be provided where desirable. In the embodiment shown in FIG. 1, two mist generators 23, each equipped with a separate compressor 25 are illustrated. The mist of coating material from the mist generators 23 is transferred to a mist delivering equalizer 26 and then passed through a slit 27 into the mist container 24.

Referring now to FIG. 13, one embodiment of the mist generator, mist delivering equalizer and mist container is shown for the purpose of illustrating the novel method of mist control according to the present invention.

The mist of coating material is forced by compressed air from a source 25 through a siphon type spray nozzle 28 toward a pool of coating material located in the mist generator 23. The coarser particles in the spray from the nozzle 28 combine with the pool of coating material, leaving only the fine particles of the spray circulating in the form of a vapor or mist.

The compressed air supplied to the mist generator 23 forces the fine mist particles out of the mist generator 23 through a plurality of pipes 29, 31 and 32 to a mist delivering equalizer 30 located in the mist container 24. The mist delivering equalizer 30 and the mist container 24 are configured to permit coating of both surfaces of the continuous sheet 1. This may be accomplished either by providing two mist delivering equalizers or constructing a single mist delivering equalizer which covers both sides of the continuous sheet 1. The use of two mist delivering equalizers 30 is preferred. If two mist delivering equalizers 30 are employed, the mist formed in one mist generator 23 may be divided and transferred to both of the mist delivering equalizers 30 in the mist container 24. Alternatively, separate mist generators 23 may be provided for each of the mist delivering equalizers. In FIG. 13, only one mist delivering equalizer is illustrated for the sake of simplicity.

It is preferable to provide a plurality of mist generators for various types of coating materials. For example, an additional mist generator 33 is shown coupled to the pipe 32. The mist generator 33 may comprise a pair of mist generators identical in structure to those illustrated at 23. This mist generator 33 can be cut in in place of the mist generator 23 by using switch valves. Thus desirable coating materials can be easily selected in various electrostatic coating operations to provide different coatings for different sheets of material.

The coating mist in the mist delivering equalizer 30 flows uniformly from the opening port or slit 27, which is aligned across the width of the continuous sheet 1, and forms the outlet port of the equalizer 30. The width of the opening port or slit 27 may be adjusted by means of a sliding shutter 26.

In order to provide a uniform coating mist, a plurality of dividing plates 34 are preferably provided within the mist container 24. A plurality of air flow ejectors 35 are then also provided within the mist container 24. Each air flow ejector 35, which receives air from the blower 15, is coupled to a compartment or space between two dividing plates 34. The mist flowing through port or slit 27 is propelled by the air flowing through ejectors 35 to an electrostatic charging zone 19 in which a charging electrode 10 is mounted. The amount of coating mist carried by the air flow into the electrostatic charging zone 19 is controlled by the volume of air flow, which is in turn controlled by the speed of the running sheet. Any excess of mist which accumulates in the mist container 24 or in the electrostatic charging zone 19 is removed by means of a conventional drain.

The mist of coating material is carried through charging zones 19 adjacent charging electrodes 10 (see FIG. 1) by the air flow from blower 15 and control valve 14. An electrode 20 which carries a charge opposite to that carried by the charging electrode 10 is employed to aid in delivering the stream of coating mist. The charged mist of coating material is then carried by the air flow into a deposition zone 18 where repelling electrodes 20' provide an electrostatic force for directing the coating mist against the surfaces of the continuous sheet 1, causing the coating mist to adhere to the surfaces of the sheet. A high voltage generator 22 is coupled to the repelling electrodes 20' to provide the electrostatic mist repelling force.

The signal produced by the converter 3 is coupled to a second ratio setter 6 for setting the charging voltage ratio, and to a second bias setter 7 for setting the charging voltage bias. The output of the second ratio setter 6 and second bias setter 7 are coupled to a high voltage generator 9. The high voltage generator 9 applies a suitable potential between charging electrode 10 and electrode 20. The charging voltage is maintained at a constant level, for example 20 Kv., when the continuous sheet is travelling at low or medium speeds, as was pointed out previously. However, the charging voltage is decreased as the running speed of the continuous sheet is increased. The ratio of decrease in the charging voltage with respect to the speed of the sheet is provided by the ratio setter 6, while the maximum or constant value charging voltage is set by the bias setter 7.

Thus, in operation the ratio setter 4 and the bias setter 5 control the volume of air flow in accordance with the speed of the sheet to maintain a uniform deposition of coating material. The bias setter 5 is therefore set to maintain a predetermined level of deposition for the lower limit of the running speed of the continuous sheet 1. In addition, the ratio setter 6 and the bias setter 7 provide control of the charging voltage in accordance with the speed of the sheet. These devices provide a predetermined maximum charging voltage when the sheet is moving slower than a predetermined maximum speed, and cause this voltage to be decreased corresponding to increases in the speed of the sheet. The ratio and bias setters 4 and 5 for controlling air flow may be reset from time to time to select different coating thicknesses. On the other hand, the ratio and bias setters 6 and 7 for controlling the charging voltage are generally not reset.

Referring now to FIGS. 8, 9 and 10, the operational characteristics of the ratio and bias setters are further illustrated. FIG. 8 illustrates the relationship between the speed of the sheet or article to be coated and the air flow volume carrying the coating material. As is shown in FIG. 8 illustrates the relationship between the speed of the sheet or article to be coated and the air flow volume carrying the coating material. As is shown in FIG. 8, the air flow volume required to carry a specific amount of coating mist is directly proportional to the running speed of the sheet within a range of ratios, namely 0.2 to 2.0. In the conventional apparatus, this ratio alone is used to control the delivery of coating material to the deposition zone. However, according to the present invention a fixed bias signal is added to the ratio information of FIG. 8, as illustrated in FIG. 9. As shown in FIG. 9, a total output designated by the line B is provided if a fixed bias A is added to the ratio 2.0 illustrated in both FIGS. 8 and 9. Similarly, if the bias A is added to a lower ratio signal than 2.0, a decreased signal characteristic illustrated by the curve C is provided. Accordingly, any desired output characteristic can be obtained by the appropriate combination of various ratio and bias signals. In this manner the coating supply delivered to the continuous sheet or article to be coated can be readily controlled for any speed range of the sheet.

However, as shown in FIG. 10, for speeds of the continuous sheet above a threshold level designated E, the amount of coating material deposited on the electrode 20 is decreased as the charging voltage is decreased. That is, when the mist of coating material passes through the charging zone 19, a certain portion of the mist is deposited on the electrode 20 and is consequently wasted. Accordingly, the supply of coating material actually passing through the charging zone 19 to the deposition zone 18 is increased by decreasing the charging voltage.

Referring now to FIG. 11, the relationship between charging voltage (horizontal axis) and deposition rate (vertical axis) is illustrated for various speeds of the continuous sheet 1. As illustrated in FIG. 11, it is desirable to keep the charging voltage in the vicinity of the magnitude B when the speed of the sheet is represented by the curve A to provide the maximum deposition rate. At higher speeds, the charging voltage must be decreased from the magnitude C to the magnitude B in order to increase the deposition rate as shown by the curves A and B in FIG. 11. By thus adjusting the charging voltage in accordance with the running speed of the sheet, the useful range of running speeds of the sheet is broadened.

Referring now to FIG. 12, the relationship between the speed of the article to be coated and the deposition rate is shown with variations in the air flow volume and charging voltage as parameters. The data represented in FIG. 12 is tabulated below.

TABLE

| | Uniformity of coated film | Applicable speed ranges |
|---|---|---|
| Conventional method | 250 mg.±20 mg. | 50 m./minute. |
| | 250 mg.±100 mg./BB* | 300 m./minute. |
| Method of present invention. | 250 mg. ± 20 mg. | 50 m./minute. |
| | 250 mg. ± 40 mg./BB* | 475 m./minute. |

*BB represents base box ($504^{cm.}$ x $71.1^{cm.}$ x $54^{sheets} \approx 40$ m.$^2$).

The data illustrated in the table compares the uniformity of a film applied with conventional techniques to the uniformity of a film applied according to the method of the present invention over various speed ranges. As shown in the table, the uniformity of the coating is the same for conventional methods and for the method of the present invention for the minimum speed of 50 m./min. However, the error in the uniformity of the coating applied by the conventional method reaches ±100 mg./BB at a speed of 300 m./min. This represents an error of approximately 40% at the speed of 300 m./min. for the conventional method. However, the uniformity of the coating applied using the method of the present invention varies only ±40 mg./BB at 475 m./min. This represents an error of only approximately 16%. The reduction in the percentage of error is particularly significant since it occurred at a running speed substantially above that at which the error in the conventional method was measured. Thus, the present invention not only permits improved uniformity in the coating applied, but it also broadens the range of useful coating speeds. Thus, the instant invention provides a method for applying a uniform coating on a sheet travelling at a varying speed by means of controlling the charging voltage and the volume of air flow in accordance with the varying speed of the sheet. By controlling both the charging voltage and the air flow volume, the present invention provides a substantially more uniform coating than was available with prior art coating techniques. Attempts have also been made to control the coating by changing only the charging voltage. However it was found that the control over the deposited coating was unstable at low speeds, especially at the beginning of the coating operation.

Many variations in the specific embodiments of some of the general components of the system are possible. For example, the bias setters may be thyristors or other suitable relay devices.

Obviously numerous additional modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A method for controlling electrostatic deposition of coating material on a continuous sheet running at varying speeds comprising the steps of:
  - creating a mist of coating material;
  - supplying a transporting air-flow for carrying said mist;
  - uniformly supplying said mist to a mist container using said air-flow;
  - adjusting said air-flow in response to variations in the speed of said continuous sheet;
  - carrying said mist with said air-flow to an electrostatic charging zone wherein said mist of coating material is electrostatically charged;
  - controlling the potential in said electrostatic charging zone in response to variations in the speed of said continuous sheet; and
  - supplying said charged mist to an electrostatic deposition zone wherein said charged mist is deposited on said continuous sheet which runs through said deposition zone.

2. A method for controlling electrostatic deposition of coating material on a continuous sheet running at varying speeds as in claim 1, wherein said step of creating a mist of coating material comprises the steps of:
  - generating a mist of coating material in a mist generator; and
  - transferring said mist of coating material to a mist delivering equalizer.

3. A method for controlling electrostatic deposition of coating material on a continuous sheet running at varying speeds as in claim 2, wherein said step of transferring said mist of coating material to a mist delivering equalizer includes the step of:
  - feeding said mist through a slit aligned parallel to the width of said continuous sheet.

4. A method for controlling electrostatic deposition of coating material on a continuous sheet running at varying speeds as in claim 1, wherein said step of creating a mist of coating material comprises the steps of:
  - generating a plurality of mists of different coating materials in a plurality of mist generator; and
  - selectively transferring one of said mists of different coating materials to a mist delivering equalizer.

5. A method for controlling electrostatic deposition of coating material on a continuous sheet running at varying speeds as in claim 1, wherein said step of carrying said mist with said air-flow to said electrostatic charging zone includes the step of:
  - controlling the amount of said mist carried by said air-flow with a control signal, said control signal including a basic component plus a component corresponding to the running speed of said sheet;

and, further comprising the step of
  - draining excess amounts of said coating material from said mist container.

6. A method for controlling electrostatic deposition of coating material on a continuous sheet running at varying speeds as in claim 5, further comprising the step of:
  - supplying a second air-flow to said mist generator and to said mist delivering equalizer, said second air-flow independent of said transporting air-flow.

7. A method for controlling electrostatic deposition of coating material on a continuous sheet running at varying speeds as in claim 5, further comprising the steps of:
  - maintaining an electric potential at a constant level in said electrostatic charging zone when said running speed of said continuous sheet is below a predetermined speed; and
  - decreasing said electric potential below said constant level when said running speed of said continuous sheet is above said predetermined speed.

8. A method for controlling electrostatic deposition of coating material on a continuous sheet running at varying speeds as in claim 1, further comprising the steps of:
  - dividing said mist container into a plurality of compartments; and
  - uniformly supplying air-flow to each of said compartments.

References Cited

UNITED STATES PATENTS

| | | | |
|---|---|---|---|
| 2,994,618 | 8/1961 | Landgraf | 118—634 |
| 2,437,606 | 3/1948 | Kaufman | 118—634 |
| 2,710,589 | 6/1955 | Brunner | 118—634 |
| 2,764,508 | 9/1956 | Feick | 118—634 |
| 2,796,845 | 6/1957 | Rendel | 118—634 |

MURRAY KATZ, Primary Examiner

M. SOFOCLEOUS, Assistant Examiner

U.S. Cl. X.R.

117—93.4 R, 106 R; 118—634, 638